(12) United States Patent
Widell et al.

(10) Patent No.: US 9,521,673 B2
(45) Date of Patent: *Dec. 13, 2016

(54) METHOD AND ARRANGEMENT FOR RESOLVING A TEMPORARY BLOCK FLOW

(71) Applicant: Telefonaktiebolaget L M Ericsson (publ), Stockholm (SE)

(72) Inventors: Daniel Widell, Vikbolandet (SE); John Walter Diachina, Garner, NC (US); Stefan Eriksson Löwenmark, Hässelby (SE); Paul Schliwa-Bertling, Ljungsbro (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/747,630

(22) Filed: Jun. 23, 2015

(65) Prior Publication Data

US 2015/0341929 A1 Nov. 26, 2015

Related U.S. Application Data

(63) Continuation of application No. 13/498,201, filed as application No. PCT/SE2012/050181 on Feb. 20, 2012, now Pat. No. 9,094,177.

(Continued)

(51) Int. Cl.
*H04W 72/04* (2009.01)
*H04L 1/00* (2006.01)
*H04L 1/16* (2006.01)

(52) U.S. Cl.
CPC ........ *H04W 72/0446* (2013.01); *H04L 1/0025* (2013.01); *H04L 1/0045* (2013.01); *H04L 1/0079* (2013.01); *H04L 1/1664* (2013.01)

(58) Field of Classification Search
CPC ................................................ H04W 72/0446
See application file for complete search history.

(56) References Cited

U.S. PATENT DOCUMENTS 7,145,896 B1 * 12/2006 Sebire .................. H04L 1/0007
370/329
8,126,013 B2 * 2/2012 Rudolf .................. H04L 1/0073
370/328

(Continued)

FOREIGN PATENT DOCUMENTS

EP 1531573 A2 5/2005
JP 2004527158 A 9/2004

(Continued)

OTHER PUBLICATIONS

Unknown, Author, "Outstanding issues of the multiple TBF concept", Siemens, 3GPP TSG GERAN WG2 #5bis, G2-010018, Helsinki, Finland, Jun. 25-29, 2001, 1-15.

(Continued)

*Primary Examiner* — Dang Ton
*Assistant Examiner* — Nourali Mansoury
(74) *Attorney, Agent, or Firm* — Murphy, Bilak & Homiller, PLLC

(57) ABSTRACT

A method for resolving a Temporary Block Flow (TBF) in a wireless network including one or more mobile stations exchanging data with a base station system. The method comprises receiving a RLC/MAC block and retrieving a first TFI in the RLC/MAC header. The TFI is compared to an assigned TFI. The capability for the associated MS to resolve TBFs based on extended TFI addressing is determined. If the received first TFI matches assigned TFI and represents a comprehensive TFI for the associated MS, the payload of the RLC/MAC block is decoded. When the first TFI matches assigned TFI value and is identified as a code point to an eTFI, at least a predetermined field of the RLC (Continued)

data block is decoded and an extended TFI, eTFI, is retrieved. The eTFI is compared with an assigned eTFI. Following a match, the payload of the RLC data block is decoded.

19 Claims, 7 Drawing Sheets

Related U.S. Application Data

(60) Provisional application No. 61/446,579, filed on Feb. 25, 2011.

(56) References Cited

U.S. PATENT DOCUMENTS

| | | |
|---|---|---|
| 8,539,308 B2 | 9/2013 | Li et al. |
| 2002/0181422 A1* | 12/2002 | Parantainen ...... H04W 72/0406 370/337 |
| 2003/0223399 A1 | 12/2003 | Ohsuge |
| 2006/0198635 A1 | 9/2006 | Emery et al. |
| 2007/0060164 A1 | 3/2007 | Kim et al. |
| 2007/0104135 A1 | 5/2007 | Pecen et al. |
| 2007/0265012 A1 | 11/2007 | Sorbara et al. |
| 2008/0274698 A1 | 11/2008 | Li et al. |
| 2008/0307284 A1 | 12/2008 | Aghili et al. |
| 2009/0135773 A1 | 5/2009 | Aghili et al. |
| 2009/0235055 A1 | 9/2009 | Araki et al. |
| 2011/0007697 A1* | 1/2011 | Ryu ..................... H04L 1/1664 370/329 |

FOREIGN PATENT DOCUMENTS

| | | |
|---|---|---|
| JP | 2007533219 A | 11/2007 |
| JP | 2009218927 A | 9/2009 |
| WO | 02065720 A1 | 8/2002 |
| WO | 2011099922 A1 | 8/2011 |

OTHER PUBLICATIONS

Unknown, Author, "Outstanding issues of the multiple TBF concept", Siemens 3GPP TSG GERAN #6, GP-011548, Naantali, Finland, Aug. 27-31, 2001, 1-15.

3GPP, "GERAN IMTC: Discussion on identifiers", 3GPP TSG GERAN #48 GP-101953, San Jose Del Cabo, Mexico Telefon AB LM Ericsson, Nov. 22-26, 2010, 1-17.

* cited by examiner

METHOD AND ARRANGEMENT FOR RESOLVING A TEMPORARY BLOCK FLOW

TECHNICAL FIELD

The present invention discloses a method and an arrangement for resolving a Temporary Block Flow in a wireless communications network.

BACKGROUND

Traffic generated in mobile networks has mostly been dominated by services that require human interaction, such as regular speech calls, web-surfing, sending MMS, doing video-chats etc. As a consequence, these mobile networks are designed and optimized primarily for these "Human Type Communication", HTC, services.

There is an increasing market segment for Machine Type Communication, MTC, services that may not require human interaction. MTC services include a diverse range of applications, e.g., vehicle applications, gas and power meter readings, and also network surveillance and cameras. The amount of MTC and HTC devices could reach a total of almost 50 billion, by the year 2020.

With the introduction of MTC devices, the GSM radio access network is facing a rapid increase in the number of mobile devices accessing and communicating through the network. MTC devices are those devices supporting communications that are not human initiated. In order for mobile networks, such as GERAN and UTRAN, to have a capability to support a mass market for MTC applications and devices, it is important to optimize the ability in the mobile networks to support MTC communication. A very large number of the MTC devices are expected to operate in the packet switched (PS) domain where a large percentage can be expected to be active sending or receiving application payload at any point in time. The amount of PS traffic in a network is continuously and rapidly increasing.

One critical issue in a mobile network is the ability to distinguish and properly address a vast number of data communicating devices for the case of simultaneous data transfer on shared radio resources. The available addressing spaces may not be sufficient. One of the identifiers that may be a bottleneck in this respect is the so called Temporary Flow Identity (TFI) which is assigned by the network to each Temporary Block Flow (TBF) for the purpose of identifying a particular TBF and transmitted Radio Link Control/Medium Access Control (RLC/MAC) blocks associated with that TBF.

Each Temporary Block Flow is assigned a Temporary Flow Identity (TFI) value by the mobile network. An RLC/MAC block associated with a certain TBF is identified by the TFI together with, in the case of an RLC data block, the direction, uplink or downlink, in which the RLC data block is sent and in the case of an RLC/MAC control message, by the direction in which the RLC/MAC control message is sent and the message type.

Every time a Mobile Station (MS) receives a downlink data or control block, it will use the included TFI field to determine if this block belongs to any (there can be more than one) of the TBFs associated with that MS. If so, the block is intended for this MS, whereupon the corresponding payload is decoded and delivered to upper layers; otherwise the block is discarded. In the uplink direction, the behavior is the same, i.e. the Base Station Subsystem (BSS) uses the TFI value to identify blocks that belong to the same TBF.

The TFI value is unique among concurrent TBFs in the same direction, i.e., uplink or downlink, on all Packet Data Channels (PDCHs) used for the TBF. The same TFI value may be used concurrently for other TBFs on other PDCHs in the same direction and for TBFs in the opposite direction, and hence a TFI is a unique identifier on a given resource such as a Packet Data Channel (PDCH). This limits the number of concurrent TBFs and thus the number of devices that may share the same radio resources.

The existing TFI address space consist of 5 bits encoded as binary number in the range 0 to 31, which is typically provided to the mobile station MS by the network upon assignment of the TBF. The number of possible TFI values is limited by the available 5 bits, enabling 32 individual values. Thus no more than 32 different mobile devices can be addressed at once on a specific timeslot. This may appear sufficient, and has until now provided no significant limitation. Given the large percentage of MTC devices that can be expected to be active sending or receiving application payload at any point in time, significantly increasing the TFI addressing space is seen as being an important enhancement. There are a number of indicators that the TFI addressing space may be a limiter in the future.

As previously mentioned, it is more than likely that the PS traffic volume, and implicitly the amount of TBFs per TRX, will increase manifold. It is not an unlikely situation that it would be beneficial to multiplex dozens or more users on the same uplink PDCH. If a TBF is assigned to be used on more than one PDCH (which is most often the case) the number of usable TFIs per PDCH drastically decreases. Assume, e.g., that all TBFs are used on all 8 PDCHs. This means that the average number of TFIs per PDCH will be 32/8=4, as compared to the 32 TFIS per PDCH that would be the case otherwise. Since it may be desirable to spread a TBF over as many PDCHs as possible in order to improve the statistical multiplexing gain and flexibility, this has the drawback of reducing the potential number of TBFs that can be supported on any given set of PDCHs, such as e.g. a Transceiver (TRX).

With recent additions to the 3GPP standards which allow use of multiple TBFs associated with one and the same MS by means of Multiple TBF procedures, the number of TBFs associated with any given MS will no longer be limited to one per direction. One particular MS could now e.g. in the downlink have one TBF for a web-surfing session, another for an ongoing VoIP call (or an audio-streaming session with e.g. Spotify) and finally a third for a messaging service such as MSN. The benefit of splitting these particular services over different TBFs is of course that they all have different service requirements, but an obvious drawback is that more TFIs are needed.

SIEMENS "Outstanding issues of the multiple TBF concept", 3GPP DRAFT; GP-011548 discloses a solution for addressing multiple TBFs wherein the TFI assignment field is modified to include more than one TFI value for multiple TBFs. However, the document does not address the problem of expanding the TFI addressing space in order to accommodate a need for additional amount of TBFs per TRX.

WO2011/099922 discloses a solution for enabling additional TFI addressing by expanding the addressing space for TFI values. The additional addressing space is achieved through a second group of TFIs comprising a TFI in the legacy addressing space together with information in the RLC/MAC block.

However, solutions for resolving a TBF in a mobile network with such an increased TFI addressing space have so far not been disclosed.

SUMMARY

It is an object of embodiments of the present invention to provide methods and arrangements for resolving a TBF in a wireless communication system providing an increased TFI addressing space.

This object is achieved by an embodiment of a method for resolving a Temporary Block Flow (TBF) in wireless network. In the wireless network, one or more mobile stations, MS, exchange data with a base stations system (BSS) by means of one or more RLC/MAC blocks each associated with an TBF. Each TBF is associated to an MS and identified by means of a Temporary Flow Identity (TFI). In the method of resolving a TBF, a receiving entity receives an RLC/MAC block including an RLC/MAC header and an RLC data block. A first TFI is retrieved from a first group of TFIs in the RLC/MAC header and compared with a TFI assigned to the TBF. The capability in the MS for additional TFI addressing is determined. When the first TFI matches the assigned TFI and is determined to correspond to a comprehensive TFI for the associated MS, the payload of the RLC/MAC block is decoded. If, on the contrary, it is determined that the first TFI represents a code point to an extended TFI (eTFI), a predetermined field in the RLC data block is decoded and the eTFI is retrieved from this field in the RLC data block. The eTFI is compared with an assigned eTFI. When a match is concluded, the payload of the RLC data block is decoded. If the first TFI does not match assigned TFI or the decoded eTFI does not match assigned eTFI, the RLC/MAC block is disregarded. The method is repeated for new RLC/MAC blocks until the TBF has been resolved.

In another embodiment, an eTFI field may be included in the optional PAN field in the RLC/MAC block. Following such inclusion of an eTFI, the method of resolving the TBF includes the step of determining the prevalence of a PAN field from a PAN indicator in the RLC/MAC header. When the PAN indicator is set, the RLC/MAC PAN field is decoded by means of the TFI. The CRC bits in the PAN field are evaluated to determine correct decoding of the PAN field. If it is determined that the decoding is correct, the RLC/MAC PAN field is read and the information contained therein is applied to the associated TBF. The decoded information from the PAN field is disregarded if it is determined that the decoding is incorrect.

The above-summarized methods may be performed in a mobile station or a base station subsystem in a mobile communications network. The MS associated with the TBF may inform the BSS of its ability to recognize eTFIs and/or of its ability to receive a RLC/MAC blocks associated with a TBF identified by means of an eTFI.

The eTFI field in the RLC data block may be protected from false detection by the inclusion of one or more CRC bits that are added to the eTFI prior to encoding. The error correcting performance of the eTFI in the RLC data block may match the error correcting performance of the TFI in the RLC/MAC header.

In further embodiments of the invention, an eTFI field may be included in all RLC data blocks associated with the TBF and located on one or more pre-defined positions in the RLC data block.

In other embodiments of the invention, eTFI information may be included in the PAN field. eTFI fields for modulation and coding schemes having a common payload size may be configured with a common size.

The object is also achieved by an embodiment of a mobile station for use in a mobile communication network comprising: an antenna, a transceiver for transmitting and receiving signals over a wireless communication channel; and a processing circuit to generate data packets for transmission over the wireless communication channel. In an embodiment of the mobile station, the processing circuit is arranged to decode a TFI in a header of a RLC/MAC block and to determine if there an extended TFI indicated by the TFI in the RLC/MAC header. The processing circuit is further arranged to decode the extended TFI from a predetermined field in the RLC data block and to match the eTFI with an assigned eTFI. The processing circuit decodes the payload in the RLC/MAC data block following a match.

In a further embodiment, the mobile station is arranged to signal the capability of decoding an eTFI field.

The object of is also achieved by an embodiment of a base station subsystem comprising an antenna, a transceiver for transmitting and receiving signals over a wireless communication channel; and a processing circuit to receive data packets from a mobile station, the processing circuit being arranged to receive information from the mobile station that the mobile stations is capable of recognizing extended TFIs encoded in a predetermined field of a RLC data block.

The inventive embodiments provide enhanced procedures for MS reception of a downlink RLC/MAC block(s) such that if a TFI of a first group, a legacy TFI, in the RLC/MAC header matches a downlink TFI value assigned to an MS for which a corresponding eTFI has also been assigned then it extracts that eTFI from the payload portion of the corresponding RLC/MAC block(s). If the MS does not find a matching eTFI then it assumes that the RLC/MAC block(s) has been sent to another MS having the same assigned TFI value but a different eTFI assignment. Contrary, if the MS finds a matching eTFI then it assumes that the RLC/MAC block(s) has been sent to it and processes the payload portion thereof accordingly.

The inventive embodiments also provides enhanced procedures for BSS reception of an uplink RLC/MAC block(s) such that if the legacy TFI in the RLC/MAC header matches an uplink TFI value for which one or more eTFI values have been assigned by the BSS, it extracts eTFI from the payload portion of the corresponding RLC/MAC block(s) and thereby allows the BSS to identify the specific MS that sent the uplink RLC/MAC block(s).

Finally, the inventive embodiments enhances the procedures for MS reception of a PAN field such that it is examined for the possibility of it including eTFI information in addition to its inclusion of legacy TFI information so that PAN information can be directed to an MS that makes use of a combination TFI value (i.e. consisting of a legacy TFI value and an eTFI value).

The embodiments of the invention enable extension of the TFI addressing space with full backwards compatibility with regard to legacy mobile stations. All functionality available in the GSM—GPRS/EGPRS radio access network will be available for both legacy mobile stations as well as for mobile stations supporting the extension of TFI addressing space.

DETAILED DESCRIPTION

The embodiments of the present invention will be described more fully hereinafter with reference to the accompanying drawings, in which embodiments of the invention are shown. The invention may, however, be embodied in many different forms and should not be construed as being limited to the embodiments set forth herein. The terminology used herein is for the purpose of describing particular embodiments only, and is not intended to limit the invention.

Figure 1:
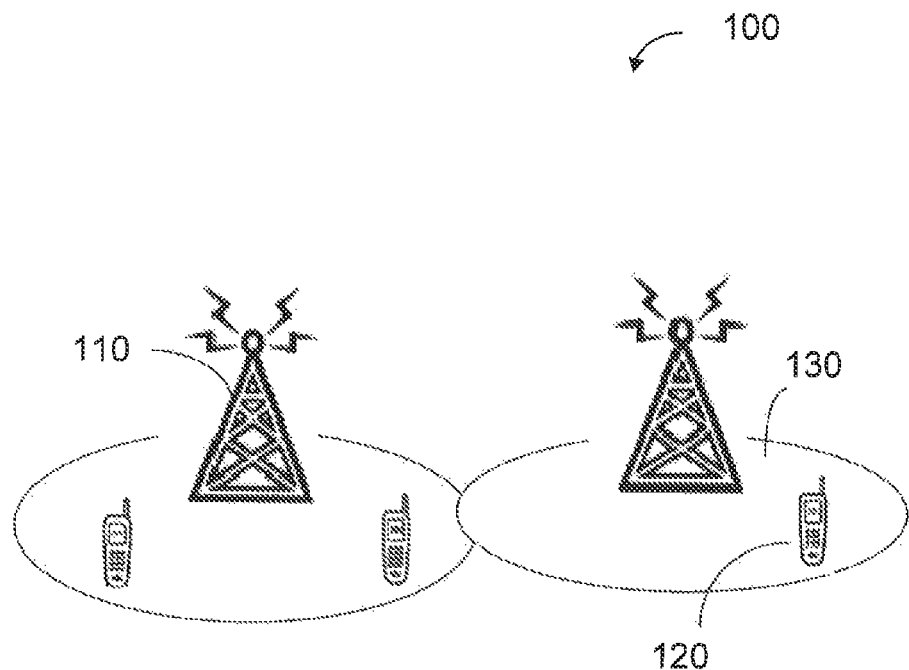
FIG. 1 shows a schematic view of a mobile network.

FIG. 1 depicts a schematic view of a mobile network 100. The purpose of the illustration in FIG. 1 is to provide a general overview of a network wherein the present methods and the functionalities involved is performed. The present methods and nodes will, as a non-limiting example, be described in a 3GPP GERAN environment.

The wireless communication system 100 comprises network node 110, and mobile stations (MS) 120, arranged to communicate with each other. MS 120 is situated in a cell 130, defined by the network node 110.

The network node 110 may be referred to as e.g., base station, NodeB, evolved Node B (eNB, or eNode B), base transceiver station, Access Point Base Station, base station router, Radio Base Station (RBS), macro base station, micro base station, pico base station, femto base station, Home eNodeB, relay and/or repeater, sensor, beacon device or any other network node configured for communication with the mobile station 120 over a wireless interface, depending e.g. of the radio access technology and terminology used. In the rest of the disclosure, the term BSS will be used in order to facilitate the comprehension of the present methods.

The mobile station 120 may be represented by e.g. a wireless communication terminal, a mobile cellular phone, a Personal Digital Assistant (PDA), a wireless platform, a user equipment unit (UE), an MTC device, a portable communication device, a laptop, a computer or any other kind of device configured to communicate wirelessly with the BSS 110.

The BSS 110 controls the radio resource management within the cell 130, such as e.g. allocating radio resources to the mobile station 120 within the cell 130. The mobile network is connected to a Core Network, CN, which is not disclosed in FIG. 1.

RLC/MAC Blocks are transferred between the BSS 110 and the mobile station 120. Each RLC/MAC Block is associated with a Temporary Block Flow (TBF) that is identified by means of its so called Temporary Flow Identity (TFI).

The TFI value is unique among concurrent TBFs in the same direction, i.e., uplink or downlink, on all Packet Data Channels (PDCHs) used for the TBF. The same TFI value may be used concurrently for other TBFs on other PDCHs in the same direction and for TBFs in the opposite direction, and hence a TFI is a unique identifier on a given resource such as a PDCH. This limits the number of concurrent TBFs and thus the number of devices that may share the same radio resources.

Figure 7:
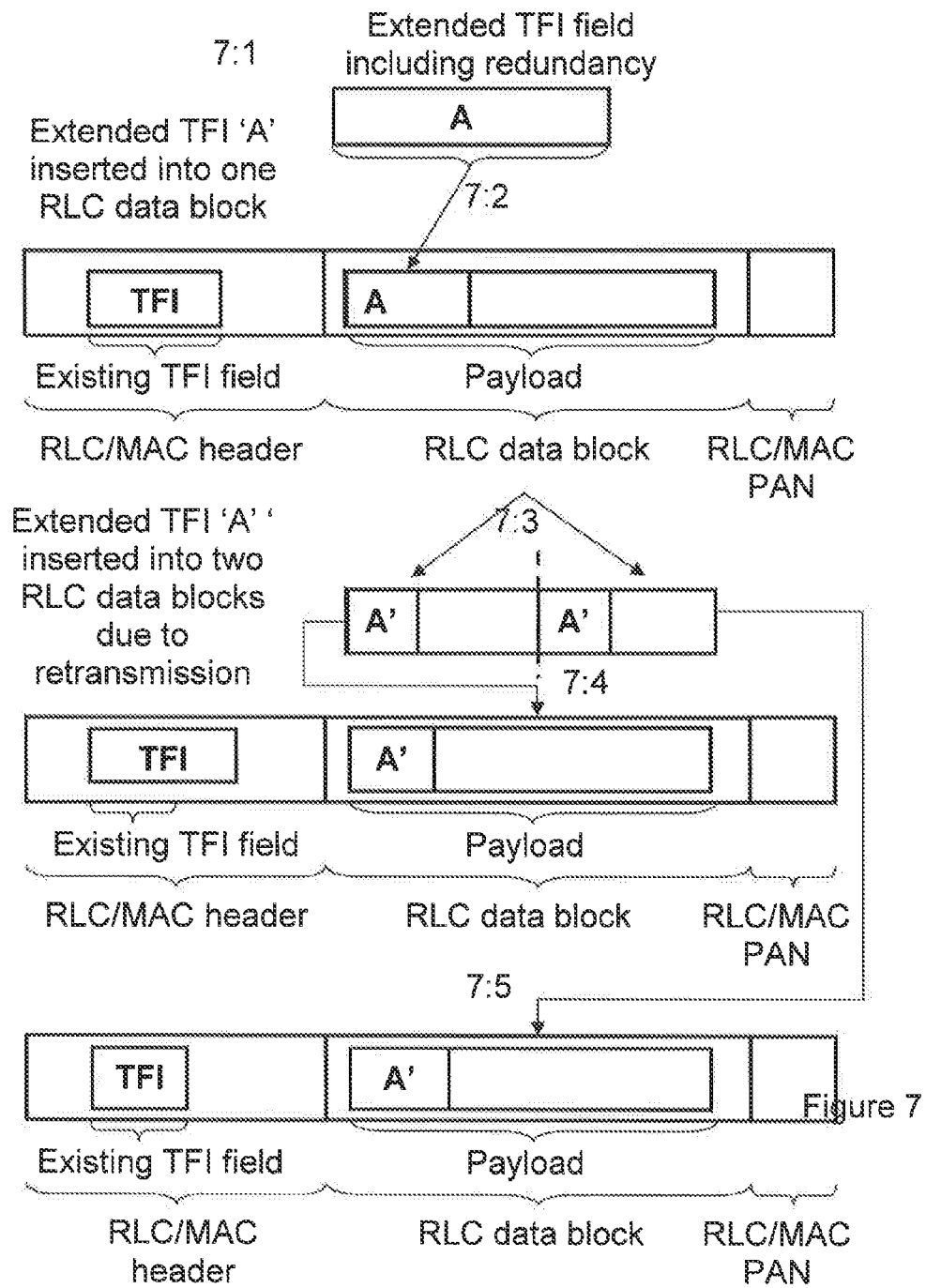
FIG. 7 discloses an embodiment of an RLC/MAC block with extended TFI.
Figure 8:
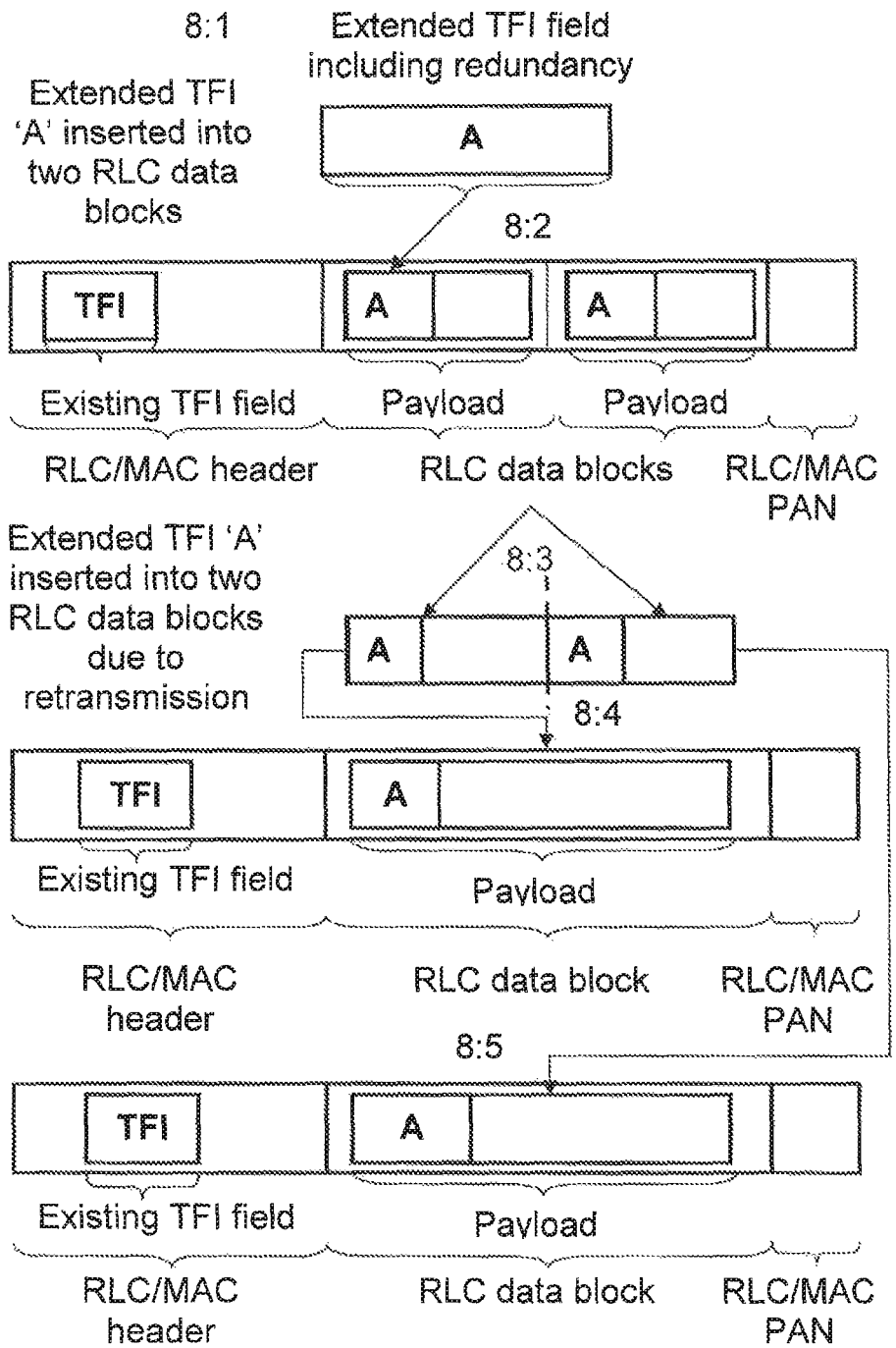
FIG. 8 discloses another embodiment of an RLC/MAC block with extended TFI.

The inventive method is based on the principle of extending the existing TFI addressing space by reserving legacy TFI addressing space as a code point to a new, separate extended TFI field in a transmitted downlink RLC/MAC block. The eTFI field is located on pre-defined positions in the RLC/MAC Data or Control block(s), as depicted in FIGS. 7 and 8. The legacy TFI code points are combined with the eTFI field in order to increase the total available TFI addressing space. The eTFIs are obtained by means of reserving one or more binary values, code points, from the legacy TFI fields or addressing space and introduce a new separate eTFI field in transmitted downlink or transmitted uplink RLC/MAC blocks. The reserved legacy TFI code points are combined with the eTFI field in order to obtain the total available TFI addressing space.

The legacy TFI code points that are to be combined with the new eTFI values can either be reserved or assigned dynamically. Thus, the number of legacy TBFs vs. the number of new TBFs is fully controlled by the mobile network and can also be adjusted dynamically by the mobile network during operation. The robustness of the eTFI field may be ensured through redundancy information, e.g. by a block code applied to the eTFI field before appending it to the payload. In this way, eTFI reception will be as robust as the existing TFI reception of the RLC/MAC header. The addressing space of TFIs is increased by introducing support for additional TFI information in the RLC/MAC blocks. The additional TFI information is denoted eTFI in the following.

The bits to be used for the new eTFI field are taken from unused spare bits that exist in many of the RLC/MAC blocks. For the downlink transmitted RLC/MAC data blocks, the maximum number of spare bits in any downlink RLC/MAC header is 2.

Figure 2:
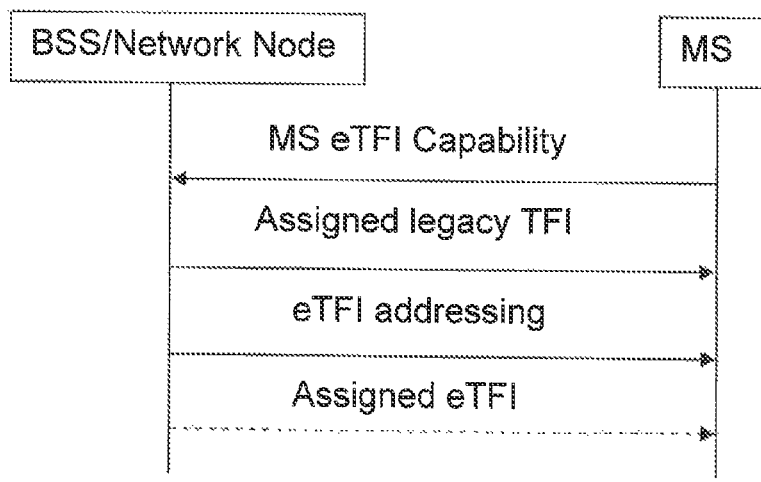
FIG. 2 discloses a signaling diagram.

There is also a need for a mobile device to be able to inform the mobile network about its capability to understand the eTFIs, i.e., the eTFI field, and for the mobile network to be able to assign an eTFI to a mobile device which is "eTFI capable". Appropriate signaling protocols for signaling between the network and the mobile device is therefore introduced by the invention. These protocols include letting the mobile device indicate its capabilities to understand the eTFI field in the MS Radio Access Capability IE, in which case one (or more) additional bit is added to this IE for this purpose. FIG. 2 discloses signaling in between the MS and BSS relating to eTFI capability.

Figure 3:
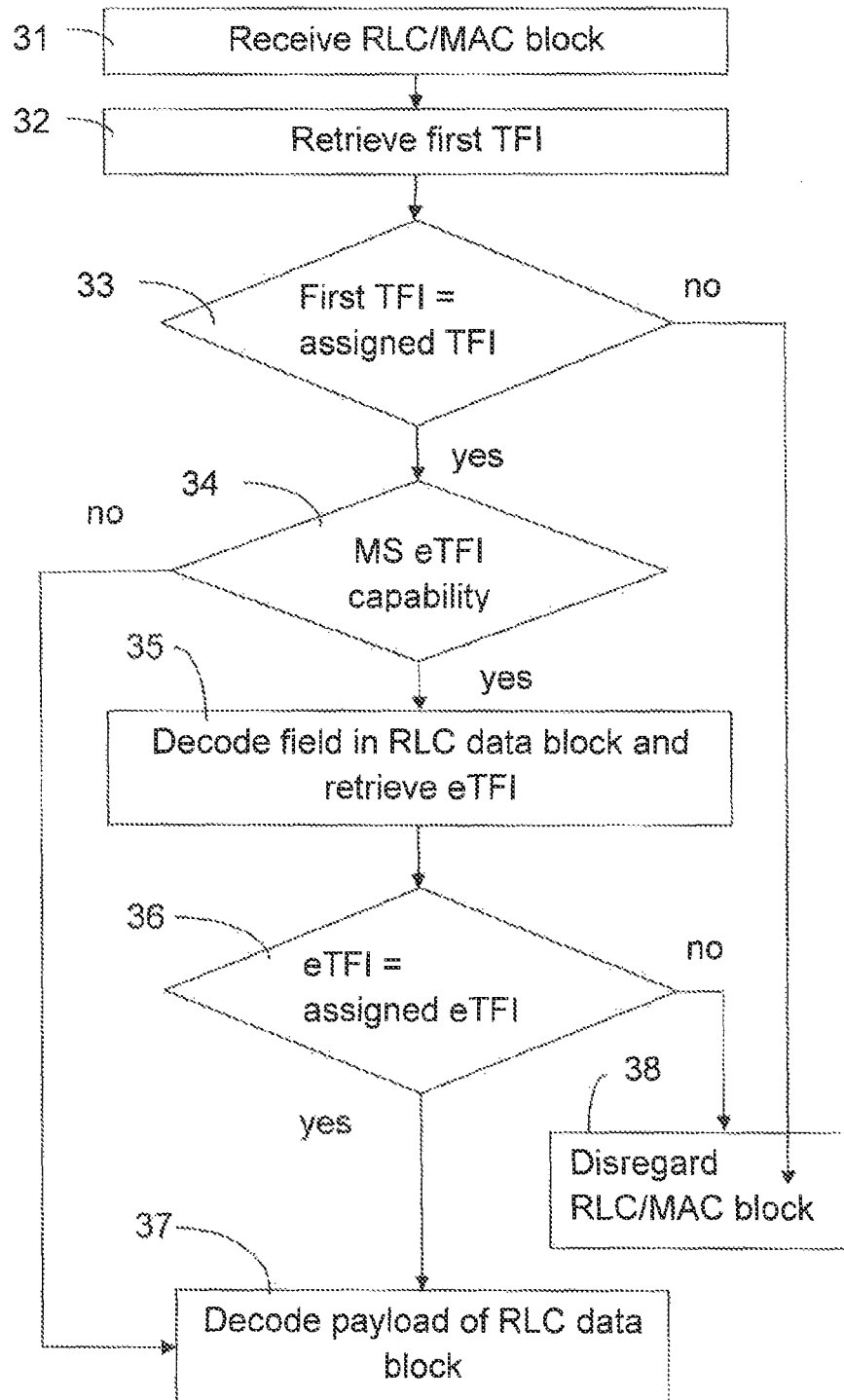
FIG. 3 shows a schematic flow chart for an embodiment of the invention.

FIG. 3 discloses an embodiment of a method for resolving a TBF. In step 31, a receiver in the MS or the BSS receives a RLC/MAC block. The TFI is retrieved, step 32, from the RLC/MAC header in a processing circuit of the receiving entity in a conventional manner. In step 33, the receiving entity checks if the TFI in the header matches the TFI assigned to the mobile station. If it does not match the assigned TFI, the receiving entity disregards the RLC/MAC block in step 33. If a match is determined between the TFI retrieved from the RLC/MAC header and assigned TFI in step 32, the receiving entity proceeds, in step 34, with determining the eTFI capability of the mobile station associated with the identified TBF. If it is determined that the mobile station represents a legacy mobile station lacking eTFI capability, the receiving entity proceeds with the decoding of the payload of the RLC data block. For mobile stations configured to support an extended TFI addressing space, the receiving entity decodes at least the predetermined relevant fields in the RLC data block and decodes the eTFI field in step 35. In step 36, the receiving entity matches the content of the decoded eTFI field with an assigned eTFI. When matching, the receiving entity continues as per existing procedure by decoding any remaining content of the RLC data block in step 37. If there is no match, the method of resolving TBF content from one RLC/MAC block is concluded by disregarding the received RLC/MAC block in step 38. The method steps disclosed in FIG. 3, are repeated for newly received RLC/MAC block until all RLC/MAC blocks associated with a TBF have been decoded.

For each transmitted RLC/MAC block there is a need to find "space" for the additional bits for the eTFI. The eTFI filed may be conveyed by using the spare bits in the RLC/MAC header. Many of the RLC/MAC header types have spare bits that are not used. These could be used to form the new eTFI field. Another alternative is to define new downlink RLC/MAC blocks for all Modulation and Coding Schemes (MCSs). A third alternative is to use the length indicator in the RLC data block.

FIG. 7 discloses an embodiment of an RLC/MAC block with extended TFI using Modulation and Coding Scheme 6, MCS-6. The payload of one RLC data block is segmented into two RLC data blocks using MCS-3 upon retransmission. For the first transmission of the payload the eTFI is encoded, as indicated in position 7:1 in FIG. 7. Position 7:2 indicates the insertion of the eTFI on a pre-defined position of the payload to the RLC data block. If retransmission of this payload is required, two different RLC data blocks may be used. The payload is then segmented into two halves, position 7:3, and each half constituting the payload for a new RLC data block. Each payload half with a new encoded eTFI denoted 'A'' is encoded into one RLC data block, see position 7:4 and 7:5. The new encoded eTFI 'A'' is based on the same eTFI value, but with a restriction (see table 1 below) that:

$$|A| = \frac{|A'|}{2},$$

where |A| denotes the length of the encoded eTFI denoted 'A' and |A'| denotes the length of the encoded eTFI denoted 'A'', respectively.

For retransmissions of RLC data blocks different MCSs can be used if they belong to the same payload family, i.e. each RLC data block carries the same amount of data. In this case also the eTFI needs to be retransmitted with the same size as in the original transmission. FIG. 8 illustrates the division of one MCS-9 radio block, carrying two RLC data blocks, into two MCS-6 radio blocks, carrying one RLC data block each, upon retransmission. For the first transmission of the payload the eTFI is encoded, position 8:1, and inserted on a pre-defined position of the payload to each RLC data block, position 8:2. Upon retransmission each RLC data block is encoded separately, position 8:3, and retransmitted position 8:4 and 8:5. The same encoded eTFI, denoted 'A', is used on all transmission occasions.

New RLC/MAC blocks are defined for all Modulation and Coding Schemes (MCSs) that already from the start contain an eTFI field in the RLC/MAC header. The coding bits needed for the eTFI field may be obtained from other parts of the downlink RLC/MAC block.

For inclusion of eTFI in the RLC data, the error correcting performance for a given modulation and coding scheme of a RLC/MAC block should match the performance of the RLC/MAC header. This is since the current TFI is contained in the RLC/MAC header. There shall be sufficient protection of false detection, e.g. by adding one or more CRC bits to the eTFI before encoding it.

All RLC blocks in a radio block may include an eTFI field. The same size of the eTFI field is used for fields of MCSs belonging to the same payload family, i.e. a common payload size. This is to ensure that the same payload size (excluding eTFI field) is used to enable incremental redundancy functionality and retransmissions of blocks within the same payload family. An exception to this rule may be foreseen for MCS-2 and 3 for EGPRS which are used when RLC blocks from MCSs carrying larger payload sizes are split.

The encoded eTFI field is appended to the payload part of the MCS and punctured, interleaved and mapped onto the four bursts of the radio block in the exact same manner as in legacy operation.

If the payload is split into two or more RLC data blocks the encoded eTFI bits from each of the RLC data blocks contain sufficient information to decode the eTFI field.

Figure 9:
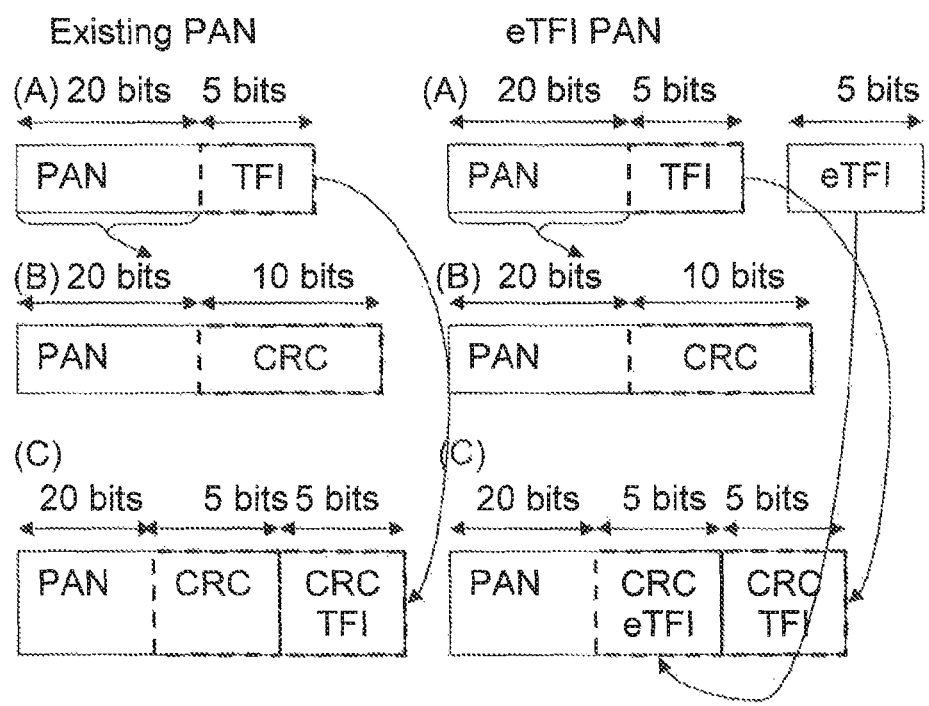
FIG. 9 discloses an embodiment of a PAN field with eTFI.

To enable the use of sending acknowledgements of data using the optional PAN field, the existing TFI field along with the extended TFI field is added in a bitwise exclusive or (xor) fashion to an existing field with CRC bits, i.e. the CRC bits of the PAN field. This is depicted FIG. 9, step 9:1-9:3 for both the existing coding of the PAN field and the coding of the TFI along with the eTFI.

In step 9:1 the PAN bits excluding the TFI bits are encoded; adding 10 CRC bits, step 9:2. On the last 5 bit positions of the CRC field the TFI bits are added, using xor addition, step 9:3.

In step 9:1 the PAN bits, excluding the TFI bits, are encoded; adding 10 CRC bits, step 9:2. On the last 5 bit positions of the CRC field the TFI bits of the extended TFI are added, using bitwise exclusive or addition. On the first 5 bit positions of the CRC field the eTFI bits of the extended TFI are added, using xor addition. This is depicted in step 9:3.

Figure 4:
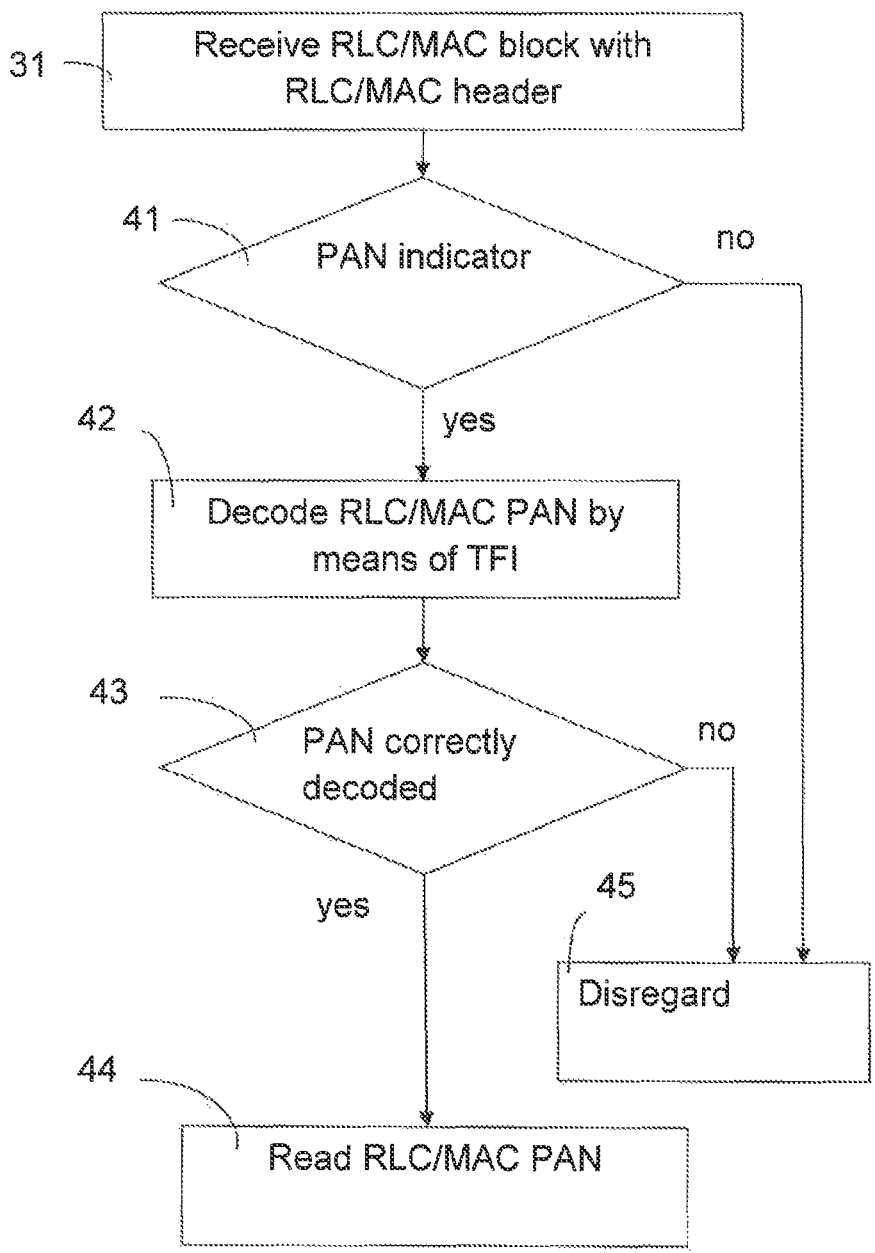
FIG. 4 shows a schematic flow chart for sending acknowledgements of data in an embodiment of the invention.

FIG. 4 discloses a schematic flow chart for sending acknowledgements of data in an embodiment of the invention. In step 41, the receiving entity checks the setting of a PAN indicator in the RLC/MAC block, received in step 31 in the MS or the BSS, and receives a RLC/MAC block. If no PAN indicator is determined, further actions for acknowledging receipt of data are disregarded, step 45. If the PAN indicator is set, the receiving entity attempts to decode the PAN field in step 42. For this purpose exor-operation with the CRC of the PAN with either it's assigned TFI (legacy or non-legacy mobile stations) or its combination TFI (non-legacy mobile stations) may be used, step 42. If the receiver determines in step 43 that the PAN field is correctly decoded, e.g. by means of the PAN CRC bits, it reads the RLC/MAC PAN in step 44 and applies the information contained therein to the TBF associated with the indicated TFI (legacy MS) or combination TFI (non-legacy mobile stations). If the receiving entity determines that the PAN CRC bits indicate that the PAN field is incorrectly decoded, further actions are disregarded, step 45.

FIG. 2 discloses a simplified signaling diagram for setting up a data exchange in the mobile network. Signaling from the mobile station to the mobile network, the mobile station capable of reading the eTFI in the manner as described in this invention needs to make the mobile network aware of this capability. This can be achieved in a number of ways, where an obvious one is to let the mobile station indicate its capabilities thereof. Such an indication may be included in the MS Radio Access Capability IE, or in a new access burst in addition to the legacy ones. This access burst is then to be used by these new mobile stations. Whenever the network node in the mobile network detects such a new access bust, it will know that it originates from such a new mobile station that is capable of reading the eTFI field. There are of course other options whereby the mobile station indicates its capabilities to read the eTFI field to a network node in the mobile network; the invention is not limited by the above disclosed exemplifying means of providing this information.

Signaling from the network node to the mobile stations, i.e. downlink signaling, the network node needs to provide information on the legacy TFI value, the code point, used to fully or partially identify the TBF and an indication if the device shall interpret the legacy TFI as a full legacy identifying a TBF or as a code point for the eTFI field. In the latter situation, information on the new eTFI value assigned to identify the TBF must be provided. It is an alternative according to the invention to include such information in the messages transmitted from the network node to the device upon TBF assignment.

Figure 6:
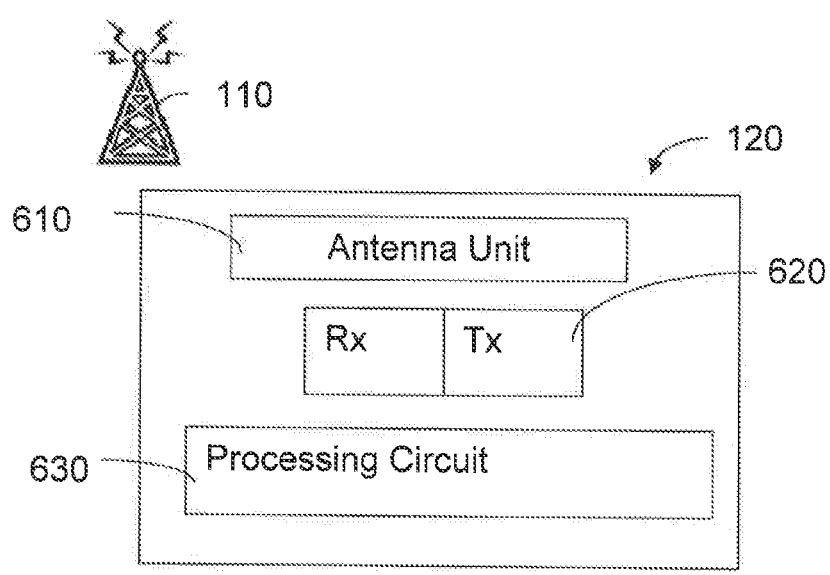
FIG. 6 shows a schematic block diagram of a mobile station of the invention.

A schematic block diagram of a mobile station 120 of the invention is shown in FIG. 6. As shown, the mobile station 1 comprises an antenna unit 610 for communication with one or more BSS 110, as well as a transceiver unit 620 also used for communication with one or more BSS 110.

The mobile station 120 also comprises a processing circuit 630 for control of the mobile station in general, and also for control of the transceiver units in particular. The mobile station 18 is intended for a mobile network such as the one in FIG. 1, and is arranged to be assigned one or more Temporary Block Flows, TBFs, by the mobile network 11, and to receive RLC/MAC Blocks from the network node, each of which RLC/MAC Blocks is associated with one of said TBFs. The mobile station 120 receives the assignment of the TBFs as well as the RLC/MAC Blocks primarily by means of the antenna unit 610, the receiver part, Rx, of the transceiver unit 620 and the processing circuit 630.

In addition, the mobile station 120 is also arranged to identify a received RLC/MAC Block by means of a Temporary Flow Identity, TFI, which has been assigned by the mobile network 100 to the TBF with which the RLC/MAC Block is associated. This identification is carried out primarily by means of the processing circuit 630. The mobile station 120 is arranged to recognize TFIs which belong to a first group of TFIs as well as TFIs which belong to a second group of TFIs, where a TFI in the second group comprises a code point given by a TFI in the first group together with additional information in the RLC/MAC block. The recognition is primarily carried out by means of the processing circuit 630.

In embodiments, the mobile station is arranged to transmit an RLC/MAC Block to the network node on a TBF, and to associate such a transmitted RLC/MAC Block with a TBF by means of a TFI which belongs to either the first group of TFIs or the second group of TFIs. The transmission is primarily carried out by means of the transmitter part, Tx, of the transceiver unit 620 and the antenna unit 610. The association of a transmitted RLC/MAC Block with a TBF by means of a TFI is primarily performed by the processing circuit 630.

In embodiments, the mobile station 120 is arranged to inform the base station system 110 of its ability to recognize TFIs which belong to the second group of TFIs and/or to associate transmitted RLC/MAC Blocks with a TBF by means of a TFI which belongs to the second group of TFIs.

Figure 5:
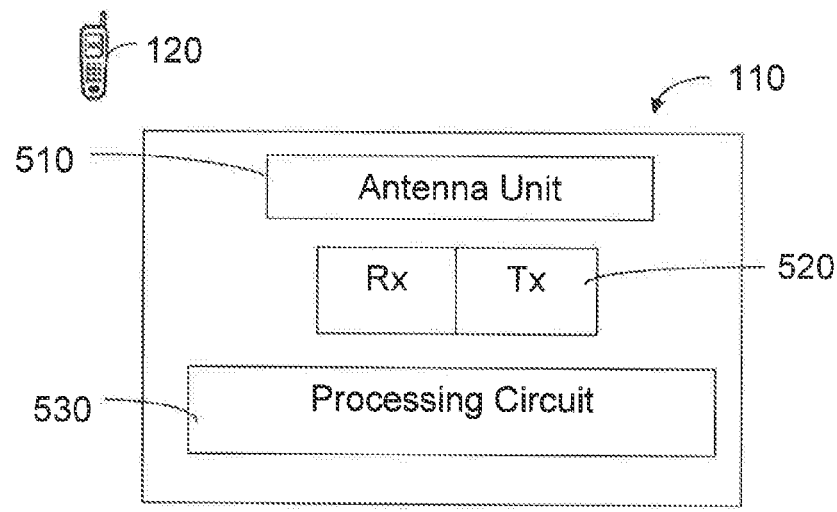
FIG. 5 shows a schematic block diagram of a base station system of the invention.

FIG. 5 discloses a base station subsystem (110), a BSS, comprising a transceiver unit (520) for transmitting and receiving signals over a wireless communication channel. A processing circuit in the BSS receives data packets from a mobile station 120. The processing circuit is arranged to receive information from the mobile station that the mobile stations is capable of recognizing extended TFIs encoded in a predetermined field of a RLC data block. Such information may be submitted as disclosed in the signaling diagram of FIG. 2, but other possibilities for assessing eTFI capability are also within the scope of the invention.

It should be noted that, even though this description has focused on new MTC devices, there is absolutely no reason why the invention could not be used for future HTC devices.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

What is claimed is:

1. A method, in a base station, for resolving a Temporary Block Flow (TBF) in a wireless network including one or more mobile stations exchanging data with the base station by means of one or more RLC/MAC (Radio Link Control/ Medium Access Control) blocks, wherein the TBF is associated to a mobile station and identified by means of a Temporary Flow Identity (TFI), the method comprising:
   receiving a RLC/MAC block including an RLC/MAC header and an RLC data block;
   retrieving a first TFI from the RLC/MAC header;
   comparing the first TFI with an assigned TFI for the mobile station;
   determining capability in the mobile station to handle extended addressing that uses an extended TFI (eTFI) field in RLC/MAC blocks;
   decoding a payload of the RLC/MAC block when the first TFI matches the assigned TFI and represents a comprehensive TFI for the mobile station;
   decoding at least a predetermined field of the RLC data block and retrieving an extended TFI (eTFI) when the first TFI matches the assigned TFI and is identified as a code point to an eTFI;
   comparing the eTFI with an assigned eTFI;
   decoding the payload of the RLC data block when the eTFI matches the assigned eTFI; and
   receiving a new RLC/MAC block and repeating the steps for said RLC/MAC block.

2. The method of claim 1, further including the steps of:
   determining a prevalence of a (Piggybacked ACK/ NACK) PAN field from a PAN indicator in the RLC/ MAC header;
   decoding the RLC/MAC PAN field by means of the TFI if the PAN indicator is set;
   evaluating CRC bits to determine correct decoding of the PAN field; and
   reading the RLC/MAC PAN and applying the information contained therein to the associated TBF if correct decoding is determined otherwise disregarding the decoded information from the PAN field.

3. The method of claim 1, further comprising receiving an indication from the mobile station, the indication informing the base station of the mobile station's ability to handle extended addressing that uses an eTFI field in RLC/MAC blocks.

4. The method of claim 1, wherein the eTFI field in the RLC data blocks is protected from false detection by inclusion of one or more CRC bits that are added to the eTFI prior to encoding.

5. The method of claim 1, wherein an eTFI field is included in all RLC data blocks associated with the TBF.

6. The method of claim 1, wherein the eTFI field is located on one or more pre-defined positions in the RLC data block.

7. The method of claim 1, wherein an error correcting performance for the eTFI in the RLC data block matches an error correcting performance of the TFI in the RLC/MAC.

8. The method of claim 1, wherein eTFI information is included in a PAN field.

9. The method of claim 1, wherein eTFI fields for modulation and coding schemes having a common payload size are configured with a common size.

10. A method, in a mobile station, for resolving a Temporary Block Flow (TBF) in a wireless network including one or more mobile stations exchanging data with a base station by means of one or more RLC/MAC blocks, wherein the TBF is associated to the mobile station and identified by means of a Temporary Flow Identity (TFI), the method comprising:
receiving a RLC/MAC block including an RLC/MAC header and an RLC data block;
retrieving a first TFI from the RLC/MAC header;
comparing the first TFI with an assigned TFI for the mobile station;
decoding a payload of the RLC/MAC block when the first TFI matches the assigned TFI and represents a comprehensive TFI for the mobile station;
decoding at least a predetermined field of the RLC data block and retrieving an extended TFI (eTFI) when the first TFI matches the assigned TFI and is identified as a code point to an eTFI;
comparing the eTFI with an assigned eTFI;
decoding the payload of the RLC data block when the eTFI matches the assigned eTFI;
disregarding the RLC/MAC block if the first TFI does not match the assigned TFI or the eTFI does not match the assigned eTFI;
receiving a new RLC/MAC block and repeating the steps for said RLC/MAC block.

11. The method of claim 10, further including the steps of:
determining a prevalence of a (Piggybacked ACK/NACK) PAN field from a PAN indicator in the RLC/MAC header;
decoding the RLC/MAC PAN field by means of the TFI if the PAN indicator is set;
evaluating CRC bits to determine correct decoding of the PAN field; and
reading the RLC/MAC PAN and applying the information contained therein to the associated TBF if correct decoding is determined otherwise disregarding the decoded information from the PAN field.

12. The method of claim 10, further comprising informing the base station of the mobile station's ability to handle extended addressing that uses an eTFI field in RLC/MAC blocks.

13. The method of claim 10, wherein the eTFI field in the RLC data blocks is protected from false detection by inclusion of one or more CRC bits that are added to the eTFI prior to encoding.

14. The method of claim 10, wherein an eTFI field is included in all RLC data blocks associated with the TBF.

15. The method of claim 10, wherein the eTFI field is located on one or more pre-defined positions in the RLC data block.

16. The method of claim 10, wherein an error correcting performance for the eTFI in the RLC data block matches an error correcting performance of the TFI in the RLC/MAC.

17. The method of claim 10, wherein eTFI information is included in a PAN field.

18. The method of claim 10, wherein eTFI fields for modulation and coding schemes having a common payload size are configured with a common size.

19. A base station comprising:
an antenna;
a transceiver for transmitting and receiving signals over a wireless communication channel; and
a processing circuit configured to:
receive, from a mobile station exchanging data with the base station by means of one or more RLC/MAC blocks each associated with a temporary block flow (TBF) identified by a Temporary Flow Identity (TFI), a RLC/MAC block including an RLC/MAC header and an RLC data block;
retrieve a first TFI from the RLC/MAC header;
compare the first TFI with an assigned TFI for the mobile station;
determine capability in the mobile station to handle extended addressing that uses an extended TFI (eTFI) field in RLC/MAC blocks;
decode a payload of the RLC/MAC block when the first TFI matches the assigned TFI and represents a comprehensive TFI for the mobile station;
decode at least a predetermined field of the RLC data block and retrieving an eTFI when the first TFI matches the assigned TFI value and is identified as a code point to an eTFI;
compare the eTFI with an assigned eTFI;
decode the payload of the RLC data block when the eTFI matches the assigned eTFI; and
receive a new RLC/MAC block and repeating the steps for said RLC/MAC block.

\* \* \* \* \*